(12) United States Patent
Tanaka et al.

(10) Patent No.: US 7,738,060 B2
(45) Date of Patent: Jun. 15, 2010

(54) LIQUID CRYSTAL DISPLAY PANEL HAVING PARTICULAR PROTRUSION AND LIGHT BLOCKING FILM FEATURES

(75) Inventors: Shinichiro Tanaka, Tottori (JP); Hironori Taniguchi, Tottori (JP)

(73) Assignee: Epson Imaging Devices Corporation, Nagano (JP)

( * ) Notice: Subject to any disclaimer, the term of this patent is extended or adjusted under 35 U.S.C. 154(b) by 195 days.

(21) Appl. No.: 11/655,234

(22) Filed: Jan. 19, 2007

(65) Prior Publication Data
US 2007/0177081 A1     Aug. 2, 2007

(30) Foreign Application Priority Data
Jan. 31, 2006   (JP)  .............................. 2006-021921

(51) Int. Cl.
G02F 1/1333   (2006.01)
G02F 1/1337   (2006.01)

(52) U.S. Cl. ...................... 349/110; 349/129; 349/130

(58) Field of Classification Search ................ 349/110, 349/129, 130
See application file for complete search history.

(56) References Cited

U.S. PATENT DOCUMENTS

| | | | |
|---|---|---|---|
| 6,256,080 B1 * | 7/2001 | Colgan et al. ................ 349/129 |
| 2004/0012739 A1 | 1/2004 | Yoon et al. | |
| 2004/0189928 A1 | 9/2004 | Yang et al. | |
| 2004/0233360 A1 * | 11/2004 | Yoshida et al. ............... 349/114 |
| 2005/0128396 A1 * | 6/2005 | Tsuchiya et al. ............. 349/123 |
| 2005/0231674 A1 * | 10/2005 | Nishimura ................... 349/139 |
| 2005/0243231 A1 | 11/2005 | Horiguchi et al. | |
| 2007/0024785 A1 | 2/2007 | Tsuchiya et al. | |

FOREIGN PATENT DOCUMENTS

| | | |
|---|---|---|
| CN | 1627155 A | 6/2005 |
| CN | 1668968 A | 9/2005 |
| JP | 2003-167253 A | 6/2003 |
| JP | 2004-69767 A | 3/2004 |
| JP | 2005-173105 A | 6/2005 |
| JP | 2005-338762 A | 12/2005 |
| JP | 2006-058734 A | 3/2006 |

* cited by examiner

Primary Examiner—Michael H Caley
(74) Attorney, Agent, or Firm—Westerman, Hattori, Daniels & Adrian, LLP (57) ABSTRACT

Liquid crystal display panel 10 is provided with TFT and pixel electrode 19, between which interlayer insulator 17 is interposed, and with reflective section 15, in each of a matrix of pixels; having first substrate whereon the pixel electrode 19 and the TFT's electrode D electrically connect via contact hole 20 formed in the reflective section 15; second substrate whereon at least one protrusions $31_1$ to $31_3$ are formed on common electrode in positions corresponding to the each pixel; perpendicular alignment layers deposited on each substrate; and liquid crystal 29 with negative dielectric anisotropy disposed between substrates. In position corresponding to base of protrusion $31_3$ provided opposite the second substrate's contact hole 20, light-blocking film $36_3$ is formed so as to cover the base viewed from above. Thus, liquid crystal display panel is provided wherein light leakage from reflective section's contact hole and from protrusions is curbed, with high contrast and display quality.

7 Claims, 8 Drawing Sheets

PRIOR ART

Fig. 4B

PRIOR ART

Fig. 5

PRIOR ART

LIQUID CRYSTAL DISPLAY PANEL HAVING PARTICULAR PROTRUSION AND LIGHT BLOCKING FILM FEATURES

FIELD OF THE INVENTION

The present invention relates to a liquid crystal display panel. More particularly it relates to a multi-domain vertically aligned (MVA) semitransmissive or reflective liquid crystal display panel in which disclination is curbed and contrast and display quality are good.

BACKGROUND OF THE INVENTION

In recent years the use of liquid crystal display devices has spread rapidly not only in information and telecommunications equipment but in ordinary electric equipment as well. Because liquid crystal display devices do not themselves emit light, use is often made of transmissive liquid crystal display devices that are equipped with a backlight. The power consumption of backlights is large, however. Accordingly, reflective liquid crystal display devices, which do not require a backlight, are employed in order to reduce power consumption, especially with portable equipment. But in dim room interiors these reflective liquid crystal display devices are hard to view, because they use external light as their light source. Over recent years therefore, especial progress has been made with development of semitransmissive liquid crystal display devices, which combine the properties of the transmissive type and the reflective type.

The liquid crystal display panel used in these semitransmissive liquid crystal display devices has, within each pixel area, a transmissive section equipped with a pixel electrode, and a reflective section equipped with both a pixel electrode and a reflecting plate. In dark places it lights a backlight and uses the transmissive sections of its pixel areas to display images, while in bright places it uses external light from the reflective sections to display images, without lighting the backlight. Thus there is no need for the backlight to be constantly lit, and consequently this panel has the merit of greatly reducing power consumption.

However, in the small-size display sections of mobile equipment, typified by mobile telephones and the like, there was previously no very large demand for the liquid crystal display panel to have a wide viewing angle, because such equipment had a limited number of users, and for related reasons. But with the increasingly functionally sophisticated mobile equipment of recent years, the demand for a wide viewing angle for the display section's liquid crystal display panel has grown rapidly. In response to such demand for a wider viewing angle for mobile equipment, efforts have been ongoing recently to develop MVA semitransmissive liquid crystal display panels to replace the TN liquid crystal display panels hitherto widely used in mobile equipment (see JP-2003-167253-A (claims, paragraphs [0050] to [0057], FIG. 1) and JP-2004-069767-A (claims, paragraphs [0044] to [0053], FIG. 1)).

Figures 4A, 4B:
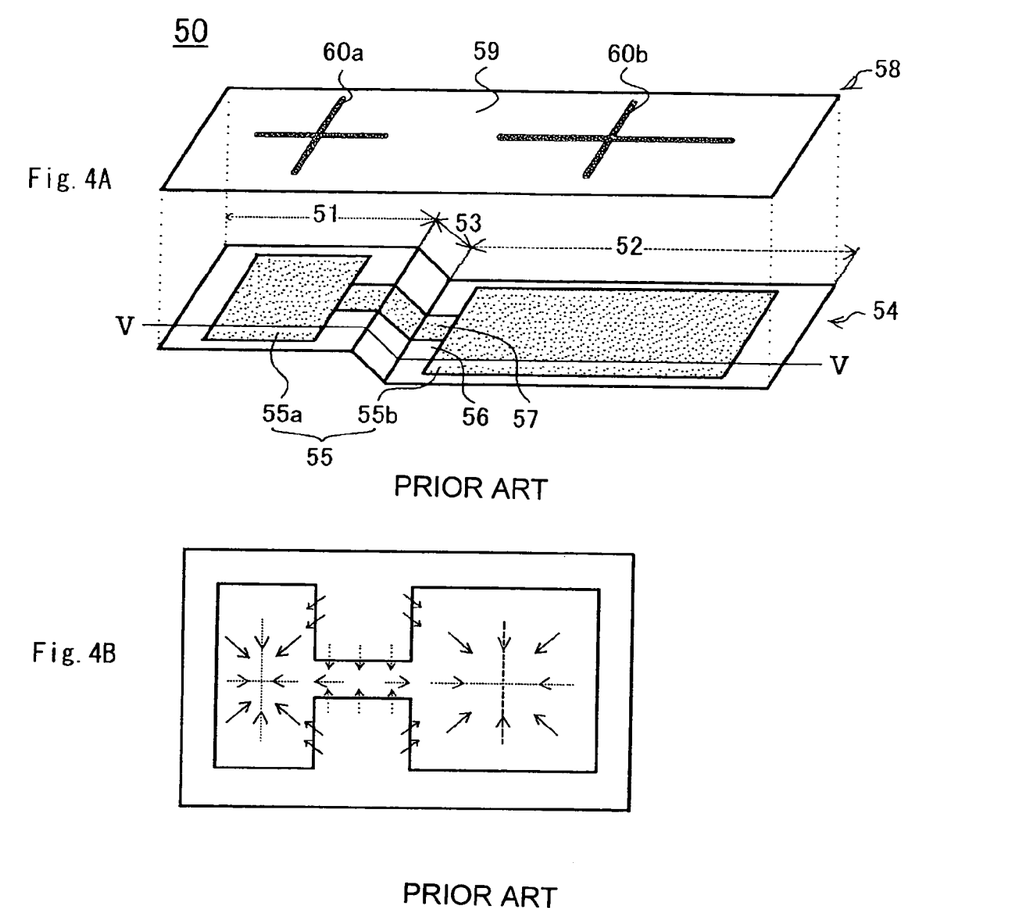
FIG. 4A is a perspective view illustrating in outline the structure of an MVA semitransmissive liquid crystal display panel.
FIG. 4B is a schematic view illustrating the inclined state of the liquid crystals when an electrical field is applied to the liquid crystal of the liquid crystal layer.

The MVA semitransmissive liquid crystal display panel disclosed in JP-2004-069767-A will now be described using FIGS. 4 and 5. FIG. 4A is a perspective view illustrating the approximate structure of an MVA semitransmissive liquid crystal display panel 50, FIG. 4B is a schematic view illustrating the inclined state of the liquid crystals when an electrical field is applied to the liquid crystals of the liquid crystal layer, and FIG. 5 is a cross-sectional view along V-V in FIG. 4A.

In this semitransmissive liquid crystal display panel 50, an inclined surface or step difference 53 is provided between a reflective section 51 and a transmissive section 52, and the reflective section 51 and transmissive section 52 are connected via the step difference 53. In the pixel electrode 55 of a first substrate 54 in the semitransmissive liquid crystal display panel 50 there is formed a first open region 56, being an area where the pixel electrode 55 is not formed. This first open region 56 constitutes a first orienting/dividing structure, and is formed so as to lie on either side of the step difference 53 and to straddle the reflective section 51 and transmissive section 52. As a result, the pixel electrode 55a in the reflective section 51 and the pixel electrode 55b in the transmissive section 52 are connected to each other via a single line 57 extending in the longitudinal direction of the semitransmissive liquid crystal display panel 50.

In the opposing electrode 59 of a second substrate 58 there are formed second open regions 60a and 60b, in locations opposite the pixel electrode 55a in the reflective section 51 and the pixel electrode 55b in the transmissive section 52, respectively. These second open regions 60a, 60b constitute a second orienting/dividing structure. The second open regions 60a, 60b are formed as cross-shaped slits, and are so arranged that the center of second open area 60a is aligned with the center of pixel electrode 55a and the center of second open area 60b is aligned with the center of pixel electrode 55b.

Figure 5:
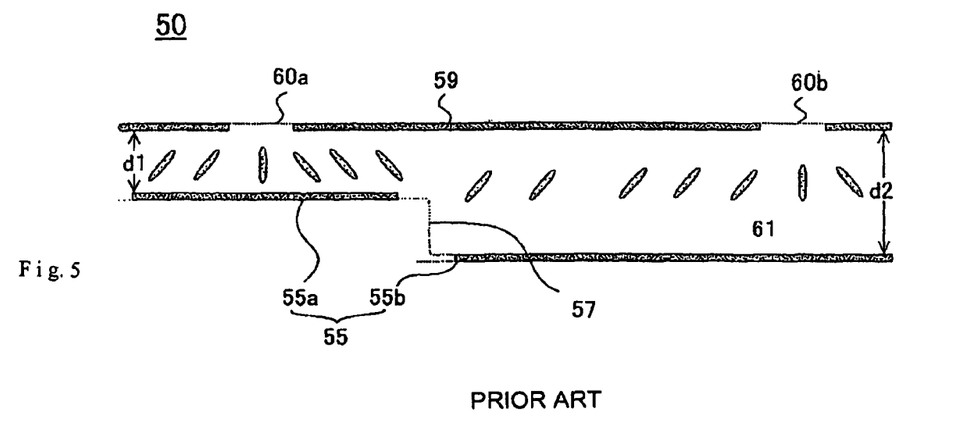
FIG. 5 is a cross-sectional view along line V-V in FIG. 4A.

When an electrical field is applied to the liquid crystals 61 of the liquid crystal layer in this semitransmissive liquid crystal display panel 50, since the dielectric anisotropy of the liquid crystals 61 is negative, over the first open region 56 at the step difference 53 the liquid crystals incline toward the line 57 on the opposing electrode 59 side, while over the reflective section 51 and transmissive section 52, the liquid crystals incline to the center of the opposing electrode 59's region corresponding to the reflective section 51 or to the center of the region corresponding to the transmissive section 52, as shown in FIGS. 4B and 5. Thus, in the semitransmissive liquid crystal display panel 50, the orientation directions of the liquid crystal molecules are determined, and therefore it is possible to reduce degradation of visual characteristics and deterioration of response speed.

The foregoing MVA semitransmissive liquid crystal display panel 50 is provided with a step difference 53 between the reflective section 51 and the transmissive section 52 on the first substrate 54, and, as is commonly known, is so configured that the cell gap d1 in the reflective section 51 and cell gap d2 in the transmissive section are in the relation d1=(d2)/2, thus being adjusted so that the display quality in the reflective section 51 is the same as the display quality in the transmissive section. But also well known is an MVA semitransmissive liquid crystal display panel in which the structure for such cell gap adjustment is provided on the second substrate.

Figure 6:
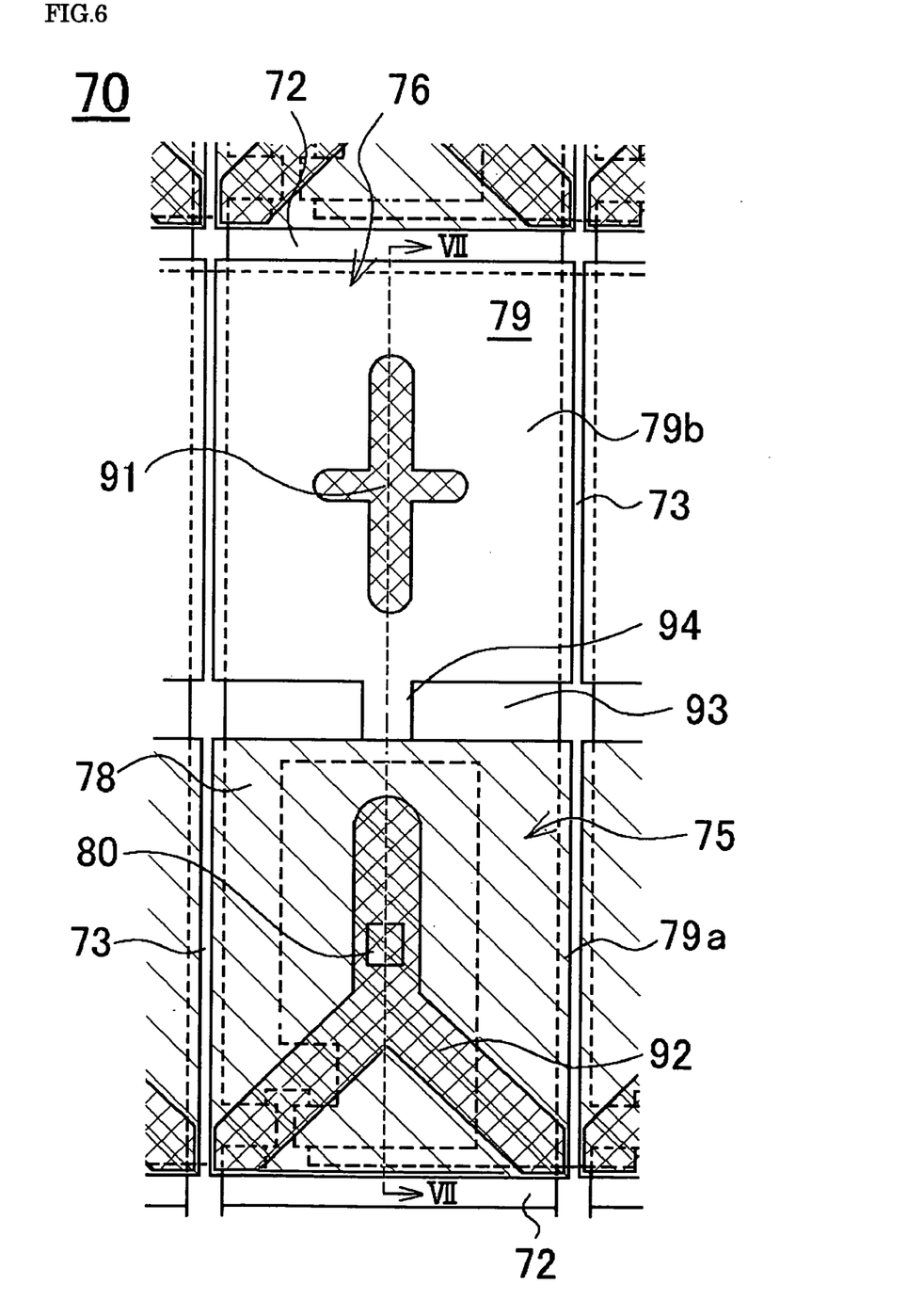
FIG. 6 is a plan view of a single pixel of another related art MVA semitransmissive liquid crystal display panel.
Figure 7:
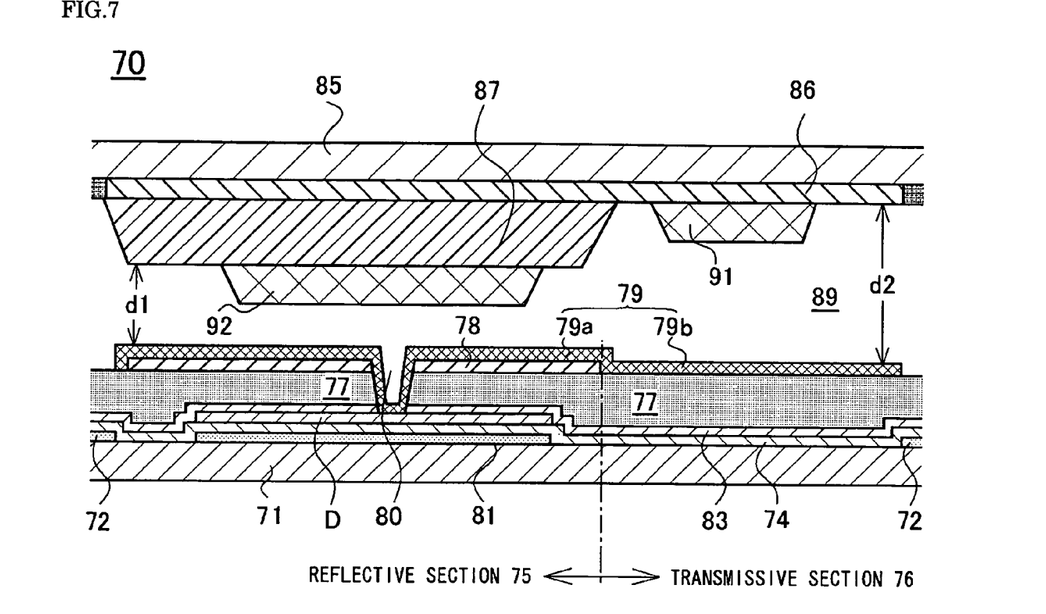
FIG. 7 is a cross-sectional view along line VII-VII in FIG. 6.

There will now be described, using FIGS. 6 and 7, an example of a related art MVA semitransmissive liquid crystal display panel 70 in which a top coat layer constituting a structure for such cell gap adjustment is provided on the second substrate. FIG. 6 is a plan view of a single pixel, seen through the second substrate, of a related art semitransmissive liquid crystal display panel in which the structure for the cell gap adjustment is provided on the second substrate, while FIG. 7 is a cross-sectional view along VII-VII in FIG. 6.

In this semitransmissive liquid crystal display panel 70, multiple scan lines 72 and signal lines 73 are each formed in a matrix, either directly or with an inorganic insulator 74 interposed, over a transparent glass substrate 71 possessing insulating properties, which is the first substrate. Each area enclosed by the scan lines 72 and signal lines 73 is equivalent to one pixel; a thin film transistor (TFT, not shown in the drawings) that serves as a switching element is formed in each pixel, and the surfaces of the TFT and other items in each pixel are covered by a protective insulator 83.

Further, in the reflective section 75 there is formed, so as to cover the scan lines 72, signal lines 73, inorganic insulator 74, protective insulator 83 and other items, a portion with a finely protruded and recessed surface, while in the transmissive section 76 there is deposited an interlayer 77 made of organic insulator with a flatly-formed surface. The concavoconvex portion of the reflective section 75 is omitted in FIGS. 6 and 7. A contact hole 80 is provided in the interlayer 77 in a position corresponding to the TFT's drain electrode D, and in the reflective section 75 of each pixel there is provided above the contact hole 80 and on the surface of the interlayer 77 a reflecting plate 78 made of aluminum metal for example. On the surface of the reflecting plate 78 and the surface of the interlayer 77 of the transmissive section 76 there is formed a transparent pixel electrode 79 made of indium tin oxide (ITO) or indium zinc oxide (IZO) for example.

Further, in the reflective section 75, an auxiliary capacity line 81 is disposed beneath the interlayer 77 in the position where the reflecting plate 78 is present; also, viewed from above, the reflecting plate 78 and pixel electrode 79 do not touch the adjacent pixel's reflecting plate and pixel electrode, and moreover are formed so as to slightly overlap to the same degree the scan lines 72 and signal lines 73, in order to prevent light leakage. In the transmissive section 76, the pixel electrode 79 does not touch the adjacent pixel's pixel electrode and reflecting plate, and moreover is formed so as to slightly overlap the scan lines 72 and signal lines 73.

Also, in this semitransmissive liquid crystal display panel 70, a slit 93 for controlling the orientation of the liquid crystal molecules is provided at the boundary region between the reflective section 75 and the transmissive section 76 of the pixel electrode 79, the pixel electrode 79 being divided into a pixel electrode 79a of the reflective section 75 and a pixel electrode 79b of the transmissive section 76, and the pixel electrode 79a of the reflective section 75 and the pixel electrode 79b of the transmissive section 76 being electrically connected via a narrow portion 94. Further, a perpendicular alignment layer (not shown in the drawings) is deposited over the surface of the pixel electrode 79 so as to cover all the pixels.

Also, over the display area of a transparent glass substrate 85 possessing insulating properties, which is the second substrate, there is provided a striped color filter layer 86, formed so as to correspond to each pixel, and being of any one of the colors red (R), green (G) or blue (B). Also, since a color filter layer 86 of the same thickness is used for the reflective section 75 and for the transmissive section 76, a topcoat layer 87 of a particular thickness is provided over the reflective section 75 portion of the color filter layer 86. This top coat layer 87 is provided over the whole of the reflective section 75 and has a thickness such that the thickness of the liquid crystal layer in the reflective section 75, or what is termed the cell gap d1, is one half the cell gap d2 of the transmissive section 76; that is, so that $d1=(d2)/2$.

Additionally, protrusions 91 and 92 for controlling the orientation of the liquid crystals are provided on, respectively, the portion of the color filter layer 86's surface that is located in the transmissive section 76 and the portion of the top coat layer 87's surface that is located in the reflective section 75, and a common electrode and a perpendicular alignment layer (neither of which is shown in the drawings) are stacked in that order on the surfaces of the color filter layer 86, top coat layer 87 and protrusions 91, 92.

The MVA semitransmissive liquid crystal display panel 70 is completed by positioning the first and second substrates to face each other, sticking the two substrates together by providing sealing around the peripheries thereof, and filling the space therebetween with liquid crystal 89 possessing negative dielectric anisotropy. Beneath the first substrate is disposed a public-domain backlight device having a light source, light guide plate, diffuser sheet and so forth, which is not shown in the drawings.

With this MVA semitransmissive liquid crystal display panel 70, in the state where no electric field is applied between the pixel electrode 79 and the opposing electrode, the liquid crystal molecules of the liquid crystal layer are oriented so that their long axes are perpendicular to the surfaces of the pixel electrode and the opposing electrode, and consequently light is not transmitted. On the other hand, when an electric field is applied between the pixel electrode and the opposing electrode, light is transmitted. This means that the device has the features that light leakage in the transmissive section will not much affect the display quality, and furthermore, thanks to the presence of the slit 93 in the pixel electrode 79 and the protrusions 91, 92, the liquid crystal molecules will incline toward protrusion 91 or 92, so that the viewing angle will be extremely wide.

Figure 8:
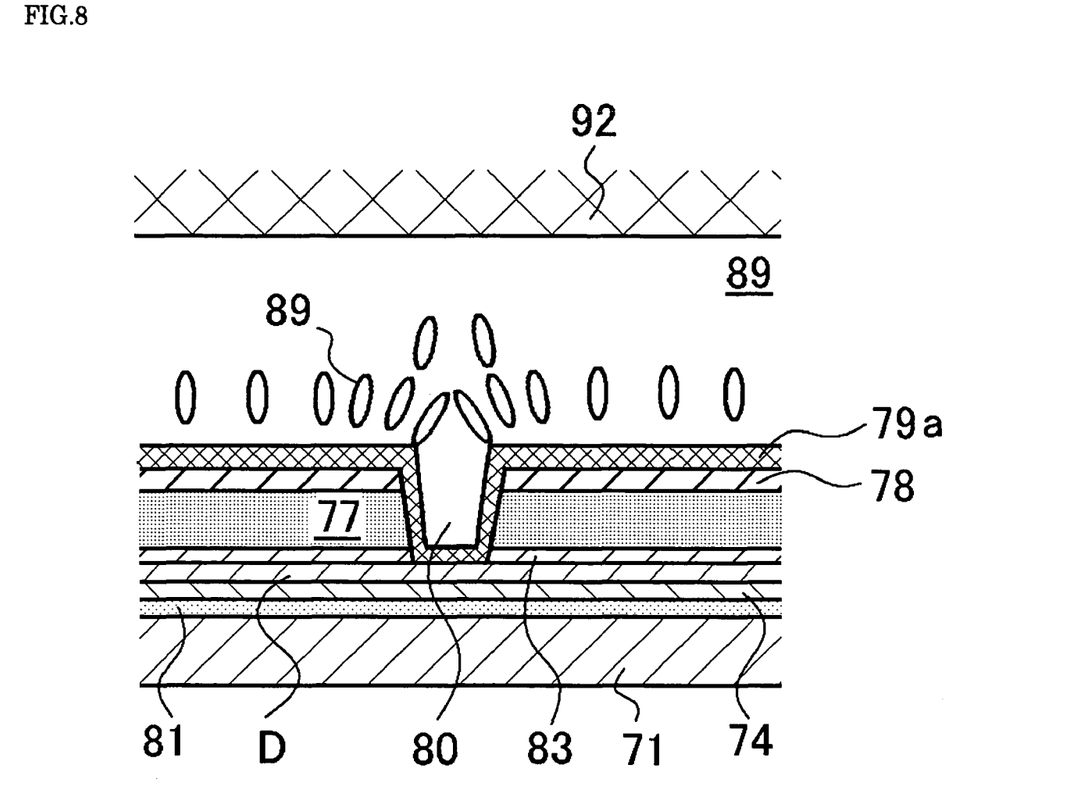
FIG. 8 is an enlarged view illustrating conceptually the liquid crystal molecules in an inclining state at the contact hole portion of FIG. 7.

In a semitransmissive liquid crystal display panel or reflective liquid crystal display device, the contact hole 80 formed in the reflective section is of a certain size and depth because it is necessary render reliable the electrical continuity between pixel electrode 79a and the TFT's drain electrode D, which serves as a switching element, and as shown in FIG. 7, the connector hole 80 is formed with inclined surfaces. Such inclining of the contact hole 80 imparts a physical force to the liquid crystal molecules 89, which causes the liquid crystal molecules 89 to incline as shown in FIG. 8. FIG. 8 is an enlarged view illustrating conceptually the liquid crystal molecules 89 in an inclining state at the contact hole 80 portion of FIG. 7.

A particular issue is that even when the liquid crystal molecules 89 are oriented by creating an electric field between pixel electrode 79a and the common electrode, the liquid crystal molecules 89, being strongly affected by the physical force of the contact hole 80, will not incline in the desired direction, and consequently exert an adverse effect on the display, so that the display quality deteriorates. Moreover, since the contact hole 80 is formed quite literally as a hole, the orientation of the liquid crystal molecules 89 is prone to be unstable from effects due to the presence of the contact hole 80, such as irregularity in the alignment layers—which are not shown in the drawings—and what is more, since the liquid crystal molecules 89 incline obliquely at the entrance portion of the contact hole 80 even when no electrical field is applied, blockage of light at this portion is incomplete, which may result in light leakage.

Further, in the vicinity of the protrusions 91, 92 formed in the second substrate, at the top surface portions of the protrusions 91, 92 the liquid crystal molecules 89 are oriented perpendicularly relative to the second substrate, but at the side portions of the protrusions 91, 92, are, under the influence of the incline angle of the side portions, oriented so as to be inclined obliquely relative to the second substrate. As a result, there exists the problem that when no electric field is applied, leakage of light from the vicinity of these protrusions occurs and the contrast deteriorates. Such a problem arising from the protrusions in an MVA liquid crystal display panel is disclosed in JP-2005-173105-A. With the invention disclosed in JP-2005-173105-A, there is set forth the provision of light-blocking films in positions corresponding to the protrusions, with the object of improving the contrast by preventing light leakage arising from disturbance of orientation due to the presence of the protrusions. However, no consideration is given to light leakage arising from the presence of the contact hole.

SUMMARY

Accordingly, an advantage of the present invention is to provide an MVA liquid crystal display panel having a reflective section, wherein an improved level of display quality is enabled through reduction of light leakage and improvement of contrast, which are achieved by preventing poor orientation due to both the contact hole and the protrusions.

In consideration of the foregoing problems, according to the present invention as set forth in claim 1 herein, the liquid crystal display panel has: a first substrate; a second substrate deployed facing the first substrate; a liquid crystal layer with negative dielectric anisotropy disposed between the first substrate and second substrate; pixels that are disposed on the first substrate in a matrix and that each have at least a reflective section; switching elements that are disposed on the first substrate so as to correspond to each pixel; an interlayer insulator that covers the switching elements; a contact hole that is formed in the interlayer insulator; a pixel electrode that is formed over the interlayer insulator and that is electrically connected to the switching elements via the contact hole; a common electrode that is provided on the second substrate; protrusions that are formed on the common electrode in positions corresponding to each pixel and that control the inclination of the liquid crystal molecules; and perpendicular alignment layers that are deposited over the first and second substrates respectively; and the protrusions are disposed at least in a position facing the contact hole, and light-blocking films that cover the bases of the protrusions as viewed from above are formed on the second substrate.

According to the present invention as set forth in claim 2 herein, the liquid crystal display panel set forth in claim 1 is provided with the further feature that the contact hole is formed in the reflective section.

According to the present invention as set forth in claim 3 herein, the liquid crystal display panel set forth in claim 1 is provided with the further feature that the shape of the bases of the protrusions and the shape of the light-blocking film are circular, oval, bar-shape, Y-shape, or a shape combining superposed Y-shape and inverted Y-shape.

According to the present invention as set forth in claim 4 herein, the liquid crystal display panel set forth in claim 1 is provided with the further feature that the pixel electrode has a transmissive section, and on the second substrate at least one of the protrusions is formed in a position corresponding to the transmissive section, and moreover light-blocking films are formed that cover the bases of the protrusions as viewed from above.

According to the present invention as set forth in claim 5 herein, the liquid crystal display panel set forth in claim 4 is provided with the further feature that the shape of the bases of the protrusions in the transmissive section and the shape of the light-blocking films are circular, oval, bar-shape, Y-shape, or a shape combining superposed Y-shape and inverted Y-shape.

According to the present invention as set forth in claim 6 herein, the liquid crystal display panel set forth in claim 1 is provided with the further feature that the light-blocking films have a shape that is identical to that of the bases of the protrusions, or that is larger than the bases of the protrusions as viewed from above.

According to the present invention as set forth in claim 7 herein, the liquid crystal display panel set forth in claim 1 is provided with the further feature that the light-blocking films are made of the same material as a black matrix that partitions the pixels on the second substrate and are formed simultaneously with the formation of the black matrix.

According to the present invention as set forth in claim 8 herein, the liquid crystal display panel set forth in claim 1 is provided with the further feature that the switching elements are thin-film field effect transistors (TFTs) and the electrodes of the switching elements are drain electrodes.

Thanks to having the foregoing features, the present invention produces the excellent advantages that will now be described. Namely, according to claim 1, in addition to the contact hole and a protrusion being formed so as to be superimposed as viewed from above, light-blocking films that cover the bases of the protrusions, as viewed from above, are formed in positions corresponding to the protrusions, thanks to which it is rendered easy for the protrusions to control the orientation of the liquid crystal molecules at the contact hole, and moreover it is possible to block out simultaneously light leakage from the contact holes and light leakage due to poor orientation of the liquid crystal molecules in the vicinity of the protrusions. As a result, a liquid crystal display panel is obtained that has reflective sections providing good contrast.

According to claim 2, the advantages of claim 1 can be produced in the reflective section. Further, with a semitransmissive liquid crystal display panel the switching elements are provided in the reflective section, so that the area above the switching elements also can be utilized effectively for display, which means that the contact hole, which serves the function of providing continuity between the switching elements' electrodes and the pixel electrode, can be formed in the reflective section in a place near to the switching elements. Therefore, reliable continuity can be more readily obtained, and moreover a reduction in the aperture area can be prevented.

According to claim 3, protrusions of the shape best suited to the shape of the pixel electrodes can be selected, so that a liquid crystal display panel having reflective sections with wide viewing angle can be obtained. Further, the contact hole will normally have a round shaped or square shaped opening, and particularly if the shape of the bases of the protrusions is round, it will be possible with a minimal size to control the orientation of the liquid crystal molecules well, and moreover the light-blocking films will be easy to manufacture, which means that the aperture can be made large, and a liquid crystal display panel having reflective sections providing bright displays can be obtained.

According to claim 4, light-blocking films that cover the bases of the protrusions, as viewed from above, are formed also for the protruding portions provided in the transmissive section, thanks to which, light leakage due to the protruding portions of the transmissive section is reduced, with the result that in addition to the advantages of the invention of claim 1, there is further obtained a semitransmissive liquid crystal display with good contrast of the transmissive sections also.

According to claim 5, protrusions of the shape best suited to the shape of the pixel electrodes can be selected for the transmissive section also, so that a semitransmissive liquid crystal display panel having transmissive sections with wide viewing angle can be obtained.

According to claim 6, the light-blocking films have a shape of the same size as the protrusions or larger than the protrusions, so that light leakage can be reduced satisfactorily. The size of the light-blocking films may be the same as or slightly larger than the bases of the protrusions, as viewed from above; the larger the size is than the base of the protrusions, the more effectively light leakage will be reduced. However, it will not be desirable to make the size too large as this will result in a small aperture ratio and dim displays.

According to claim 7, the light-blocking films are formed of the same material as and simultaneously with the black matrix, so that the light-blocking films can be formed in a simple manner with no increase in time and labor.

According to claim 8, widely used TFTs are employed as the switching elements of a matrix liquid crystal display panel, so that a high-speed, high-performance and high-reliability liquid crystal display panel is obtained.

DESCRIPTION OF THE PREFERRED EMBODIMENT

The present invention will now be described in more detail using a preferred embodiment and the accompanying drawings. It should be understood however that the embodiment below is merely an illustrative example of a semitransmissive liquid crystal display panel for realizing the technical concepts of the present invention. The embodiment is not intended to limit the invention to the display panel here set forth. The invention is equally applicable to reflective liquid crystal display panels and other liquid crystal display panels having a reflective section.

First Embodiment

Figure 1:
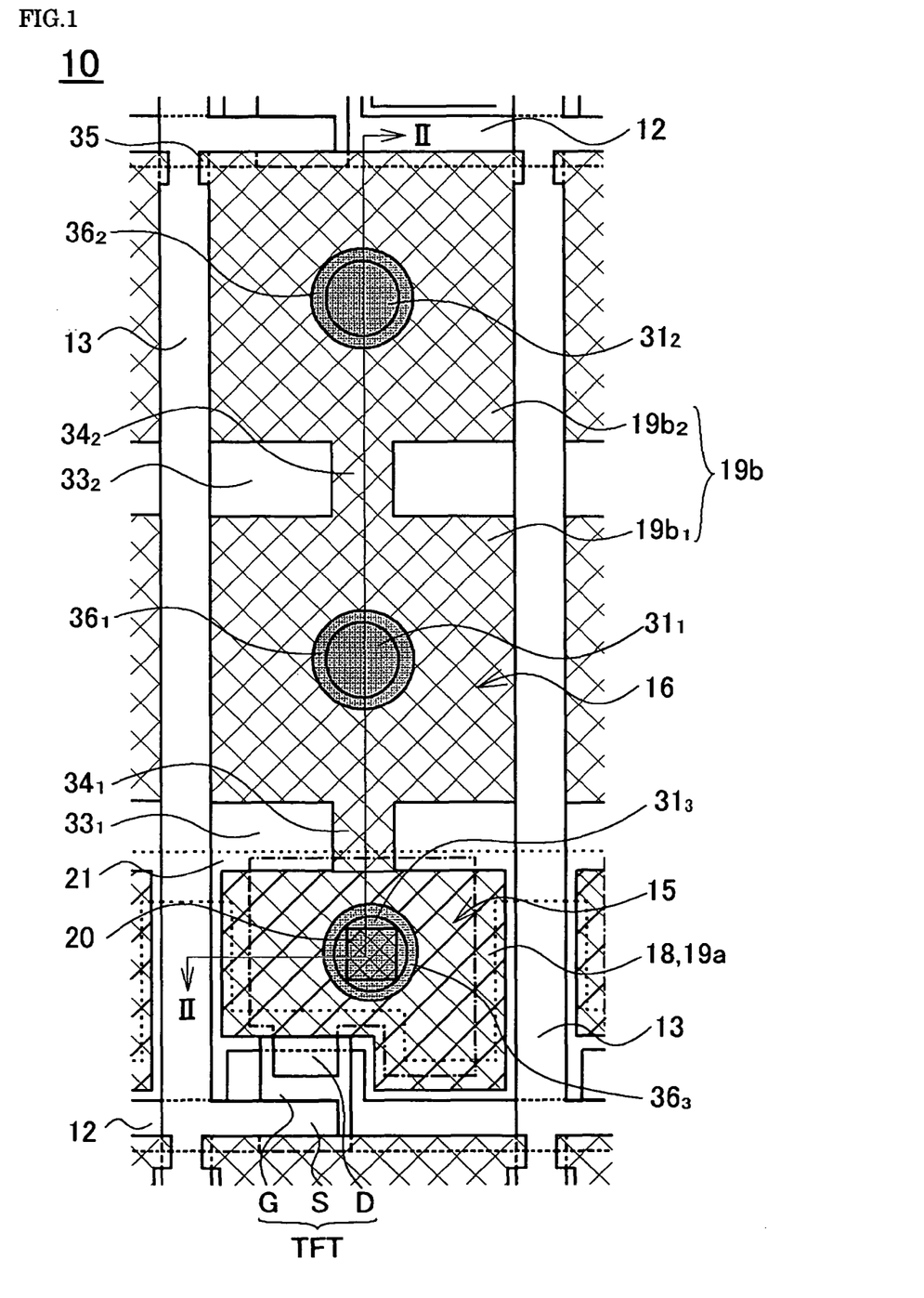
FIG. 1 is a schematic plan view of one pixel portion of the semitransmissive liquid crystal display panel according to the embodiment, seen through the color filter.
Figure 2:
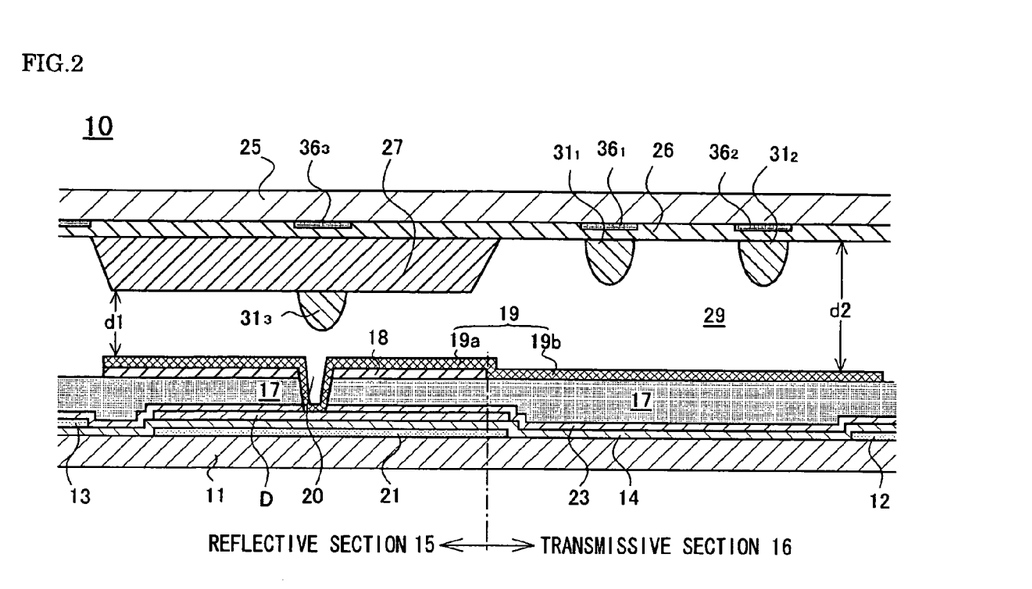
FIG. 2 is a cross-sectional view along line II-II in FIG. 1.

The semitransmissive liquid crystal display panel according to the embodiment is illustrated in FIGS. 1 and 2. FIG. 1 is a schematic plan view of one pixel portion of the semitransmissive liquid crystal display panel, seen through the color filter, while FIG. 2 is a cross-sectional view along II-II in FIG. 1.

In this MVA semitransmissive liquid crystal display panel 10, multiple scan lines 12 and signal lines 13 are each formed, either directly or with an inorganic insulator 14 interposed, as a matrix over a transparent glass substrate 11 possessing insulating properties, which is the first substrate. Each area enclosed by the scan lines 12 and signal lines 13 is equivalent to one pixel; a TFT that serves as a switching element is formed in each pixel, and the surfaces of the TFT and other items in each pixel are coated with a protective insulator 23.

Further, on the surface in the reflective section 15 there is formed, so as to cover the scan lines 12, signal lines 13, inorganic insulator 14, protective insulator 23 and other items, a finely protruded and recessed portion, while in the transmissive section 16 there is deposited an interlayer 17 made of photo-resist or other organic insulator with flatly-formed surface. The concavoconvex portion of the reflective section 15 is omitted in FIGS. 1 and 2. A contact hole 20 is provided in the interlayer 17 in a position corresponding to the TFT's drain electrode D, and in the reflective section 15 of each pixel, above the contact hole 20 and on the surface of the interlayer 17, there is provided a reflecting plate 18 made of aluminum metal for example. On the surface of the reflecting plate 18 and on the surface of the interlayer 17 of the transmissive section 16 there is formed a transparent pixel electrode 19 made of ITO or IZO for example.

Also, in this semitransmissive liquid crystal display panel 10, a slit $33_1$ for controlling the orientation of the liquid crystal molecules is provided at the boundary region of the reflective section 15 and the transmissive section 16 of the pixel electrode 19, so that the pixel electrode 19 is divided into a pixel electrode 19a of the reflective section 15 and a pixel electrode 19b of the transmissive section 16, with the pixel electrode 19a of the reflective section 15 and the pixel electrode 19b of the transmissive section 16 being electrically connected via a narrow portion $34_1$.

Further, on the reflective section 15 side, there is disposed an auxiliary capacity line 21 beneath the position on the interlayer 17 where the reflecting plate 18 is located. Also, the reflecting plate 18 and pixel electrode 19a are so provided that, as viewed from above, they do not touch the adjacent pixel's reflecting plate and pixel electrode, do not overlap the scan lines 12 and signal lines 13, and have essentially the same shape, so as to be superposed. Furthermore, the transmissive section 16 side pixel electrode 19b is provided so as not to touch the adjacent pixel's pixel electrode and reflecting plate, and moreover so as to lie alongside the signal lines 13 and not to overlap the signal lines, but also is formed so as to overlap slightly the scan lines 12. In this embodiment, both extremities 35 of that portion of the transmissive section 16's pixel electrode 19b that runs alongside and overlaps the scan line overlap slightly the signal lines 13; the reason for this is in order to prevent the scan line 12 from being bared and affecting the orientation of the liquid crystal molecules if mask misalignment or other problem should occur during formation of the pixel electrode 19.

Moreover, in the semitransmissive liquid crystal display panel 10 of the embodiment, the pixel electrode 19b of the transmissive section 16 is made larger in area than the pixel electrode 19a of the reflective section 15, and is divided by another slit $33_2$, provided in the middle portion, into two regions $19b_1$ and $19b_2$, these two regions $19b_1$ and $19b_2$ being electrically connected via a narrow portion $34_2$. Further, a perpendicular alignment layer (not shown in the drawings) is deposited on the first substrate's surface, including the surface of the pixel electrode 19, so as to cover all the display areas.

The reasons why the transmissive section's pixel electrode 19b has its area made large and is divided into two regions $19b_1$ and $19b_2$ are, respectively: because a semitransmissive liquid crystal display panel for a mobile telephone is high-definition and often displays images, so that on many occasions its backlight is constantly lighted and it is used as a transmissive liquid crystal display panel; and, in order that control of the liquid crystal molecules' orientation can be carried out over the whole of the transmissive section's pixel electrode 19b, which has a large area.

Over the display area of a transparent glass substrate 25 possessing insulating properties, which is the second substrate, there is provided a striped color filter layer 26, formed to correspond to each pixel, and being of any one of the colors red (R), green (G) or blue (B). Further, since a color filter layer 26 of the same thickness is used for the reflective section 15 and the transmissive section 16, a topcoat layer 27 of a particular thickness is provided over the reflective section 15 portion of the color filter layer 26. This top coat layer 27 is provided over the whole of the reflective section 15, and has a thickness such that the thickness of the liquid crystal layer 29 in the reflective section 15, or what is termed the cell gap d1, is one half the cell gap d2 of the transmissive section 16; that is, so that d1=(d2)/2.

Further, artillery-shell-like protrusions $31_1$ and $31_2$ for controlling the orientation of the liquid crystal molecules are provided on parts of the surface of the color filter layer 26 located in the transmissive section 16, so as each to be positioned opposite the center portion of one of the two regions $19b_1$ and $19b_2$ of the pixel electrode 19b of the transmissive section 16. In addition, there is also provided an artillery-shell-like protrusion $31_3$ in the position on the surface of the reflective section 15's topcoat 27 that is opposite the contact hole 20. Moreover, a common electrode and a perpendicular alignment layer (neither of which is shown in the drawings) are stacked in that order over the surfaces of the color filter layer 26, top coat layer 27 and protrusions $31_1$ to $31_3$.

In addition, in the portions of the color filter 26 that correspond to the base of each protrusion $31_1$ to $31_3$, there are formed light-blocking films $36_1$ to $36_3$ each of which is slightly larger than the base of the respective protrusion $31_1$ to $31_3$ as viewed from above. These light-blocking films $36_1$ to $36_3$ can be formed of the same material as, and simultaneously with, the black matrix 37 that is provided at the boundaries of the various colors during fabrication of the striped color filter layer 26. In this way, the light-blocking films can be formed in a simple manner, with no increase in the time and labor for forming the light-blocking films $36_1$ to $36_3$. In FIG. 2, the size of the light-blocking films $36_1$ to $36_3$ is shown as being slightly larger than the size of the bases of the protrusions $31_1$ to $31_3$, but could alternatively be essentially the same size as the bases of the protrusions $31_1$ to $31_3$.

Also, the size of the base of the reflective section's protrusion $31_3$ will preferably be larger than the size of the contact hole 20—for example, with a contact hole 20 of size approximately 7×7 μm, it will be preferable to make the width of the protrusion $31_3$'s base approximately 8 μm. At the light-blocking film $36_3$ corresponding to the protrusion $31_3$ in this embodiment, the protrusion $31_3$ is provided so as to be superposed over the contact hole 20 of the first substrate 11 as viewed from above, and therefore the light-blocking film $36_3$ also is disposed so as to be superposed over the contact hole 20. Therefore, even if light should leak from the contact hole 20, the light-blocking film $36_3$ will act to prevent it from leaking to the exterior, and thus the light-blocking film $36_3$ is able to block both light leakage from the contact hole 20 and light leakage due to poor orientation of the liquid crystal molecules in the vicinity of the protrusion $31_3$.

In addition, light-blocking films $36_1$ and $36_2$ are formed at the bases of the transmissive section's protrusions $31_1$ and $31_2$ so as to be the same size as or slightly larger than the bases of the protrusions $31_1$ and $31_2$ as viewed from above, which means that even if, when no electric field is applied, disturbance should occur in the orientation of the liquid crystal molecules in the vicinity of the protrusions $31_1$, $31_2$ and light should leak, such leaked light will be blocked by the light-blocking films $36_1$ and $36_2$ and will therefore rarely emerge to the exterior. Thus it will be possible in the transmissive section also to greatly reduce deterioration in the contrast due to leakage of light when no electrical field is applied.

To complete the MVA semitransmissive liquid crystal display panel 10, the first and second substrates are positioned to face each other, the two substrates are stuck together by providing sealing around the peripheries thereof, and the space therebetween is filled with liquid crystal 29 possessing negative dielectric anisotropy. Below the first substrate is disposed a public-domain backlight device having a light source, light guide plate, diffuser sheet and so forth, which is not shown in the drawings.

Figure 3:
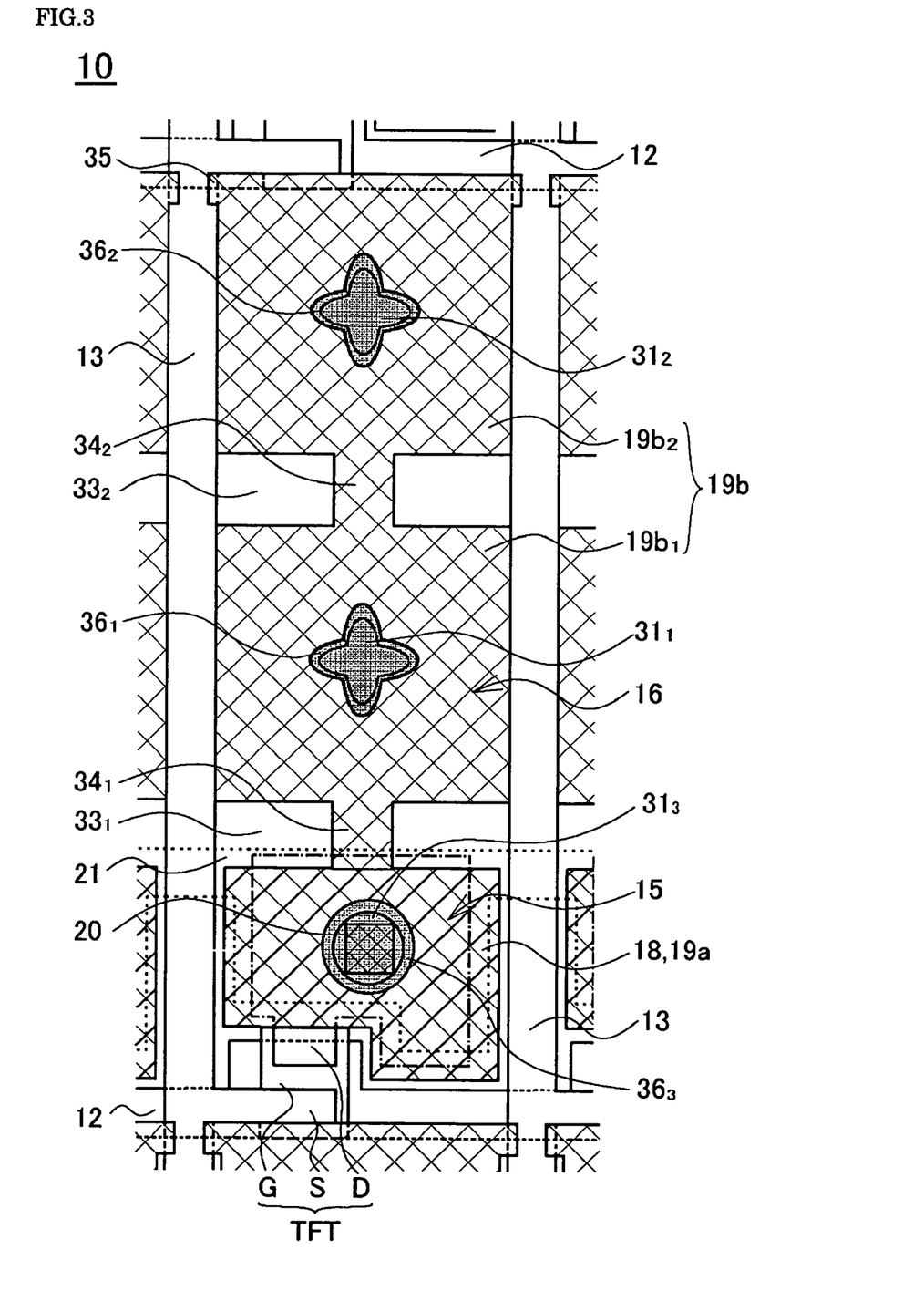
FIG. 3 is a schematic plan view, corresponding to FIG. 1, of a variant of the embodiment.

It will be appreciated that although in the semitransmissive liquid crystal display panel 10 of this embodiment, artillery-shell-like protrusions $31_1$ to $31_3$ are provided as the orientation controlling members on the second substrate, the present invention is not limited to such example; the transmissive section's orientation controlling members $31_1$, $31_2$ might alternatively be items with bases that are cross-shaped as viewed from above, such as shown in FIG. 3. Moreover, the shape of the bases could also be bar-shape, Y-shape, or a combination of superposed Y-shape and inverted Y-shape. FIG. 3 represents a variant of the present embodiment in which the transmissive section's protrusions are cross-shaped at the base as viewed from above. Components in FIG. 3 that are the same as those in FIGS. 1 and 2 are assigned the same reference numerals and detailed descriptions thereof are omitted here.

Also, although the foregoing embodiment represents an example where the pixel electrode 10b of the transmissive section 16 is divided into two by a slit $33_2$, it will alternatively be possible not to provide the slit $33_2$. In either case, there should be provided, at the bases of the transmissive section's protrusions, light-blocking films of the same size as or slightly larger than the bases of the protrusions as viewed from above.

With MVA semitransmissive liquid crystal display panels, it is inherently the case that in the state where no electric field is applied to the liquid crystal molecules, light will not be transmitted through the liquid crystal layer as long as the molecules are oriented perpendicularly. Accordingly, since in the MVA semitransmissive liquid crystal display panel 10 of the embodiment the perpendicular alignment layer is provided also at the portions where the slits $33_1$ and $33_2$ are provided in the pixel electrode 19, and therefore no light will be transmitted at such slit portions, the auxiliary capacity line 21 lying below the reflecting plate 18 is further extended into the slit $33_1$ area of the transmissive section 16, in order to render the auxiliary capacity larger.

Also, although the MVA semitransmissive liquid crystal display panel 10 of the embodiment represents an example where the pixel electrode 19b in the transmissive section 16 is provided so as to lie alongside the signal lines 13 and not to overlap the signal lines 13, it is however technically difficult to provide the pixel electrode 19b in the transmissive section 16 so as to lie precisely alongside the signal lines 13. Therefore it will be permissible to have slight gaps occur between the transmissive section's pixel electrode 19b and the signal lines 13, or conversely to have the transmissive section's pixel electrode 19b and the signal lines 13 overlap slightly. Even with slight gaps between the transmissive section's pixel electrode 19b and the signal lines 13, the fact that the perpendicular alignment layer is provided at such gap portions means that there will be no leakage of light from such gap portions.

The invention claimed is:

1. A liquid crystal display panel comprising:
   a first substrate;
   a second substrate deployed facing said first substrate;
   a liquid crystal layer with negative dielectric anisotropy disposed between said first substrate and second substrate;
   pixels that are disposed on said first substrate in a matrix and that each have at least a reflective section;
   switching elements that are disposed on said first substrate so as to correspond to each pixel;
   an interlayer insulator that covers said switching elements;
   a contact hole that is formed in said interlayer insulator;
   a pixel electrode that is formed over said interlayer insulator and that is electrically connected to said switching elements via said contact hole;
   a common electrode that is provided on said second substrate;
   protrusions that are formed on said common electrode in positions corresponding to each pixel and that control the inclination of the liquid crystal molecules; and
   perpendicular alignment layers that are deposited over the first and second substrates respectively;
   said protrusions being disposed at least in a position facing said contact hole, and light-blocking films that cover the bases of said protrusions as viewed from above being formed on said second substrate and the size of said light-blocking films being identical to or larger than the bases of said protrusions and the size of the bases of said protrusions being larger than the size of said contact hole.

2. The liquid crystal display panel according to claim 1, wherein said contact hole is formed in said reflective section.

3. The liquid crystal display panel according to claim 1, wherein the shape of the bases of said protrusions and the shape of said light-blocking films are circular, oval, bar-shape, Y-shape, or a shape combining superposed Y-shape and inverted Y-shape.

4. The liquid crystal display panel according to claim 1, wherein said pixel electrode has a transmissive section, and on the second substrate at least one of the protrusions is formed in a position corresponding to said transmissive section, and moreover light-blocking films are formed that cover the bases of said protrusions as viewed from above.

5. The liquid crystal display panel according to claim 4, wherein the shape of the bases of the protrusions in said transmissive section and the shape of said light-blocking films are circular, oval, bar-shape, Y-shape, or a shape combining superposed Y-shape and inverted Y-shape.

6. The liquid crystal display panel according to claim 1, wherein said light-blocking films are made of the same material as a black matrix that partitions the pixels on said second substrate and are formed simultaneously with the formation of said black matrix.

7. The liquid crystal display panel according to claim 1, wherein said switching elements are thin-film field effect transistors (TFTs) and electrodes of said switching elements are drain electrodes.

* * * * *